United States Patent [19]

MacMillan

[11] 4,025,250
[45] May 24, 1977

[54] SEGMENTED MATRIX WITH GUIDE MEANS AND RETAINING PINS

[75] Inventor: Kenneth T. MacMillan, Macon, Ga.

[73] Assignee: MacMillan Mold Co., Inc., Macon, Ga.

[22] Filed: Nov. 25, 1975

[21] Appl. No.: 635,061

[52] U.S. Cl. .................................. 425/17; 425/20; 425/25; 425/47; 425/DIG. 5; 308/4 R
[51] Int. Cl.² .......................................... B29H 5/04
[58] Field of Search ............... 425/20, 47; 308/4 R

[56] References Cited
UNITED STATES PATENTS

| | | | |
|---|---|---|---|
| 3,778,203 | 12/1973 | MacMillan | 425/20 |
| 3,787,155 | 1/1974 | Zangl | 425/47 |

FOREIGN PATENTS OR APPLICATIONS 1,160,606   1/1964   Germany ........................... 425/47

Primary Examiner—J. Howard Flint, Jr.
Attorney, Agent, or Firm—Diller, Brown, Ramik & Wight

[57] ABSTRACT

This disclosure relates to a retread mold assembly which includes a base and a plurality of matrix segments which are movable relative to the base and in the closed position thereof define a generally annular cavity, spring-biased guide means normally urge the matrix segments away from the base, and pin means are provided and secured to the base for quick-disconnect coupling and uncoupling of the matrix segments to the base.

22 Claims, 8 Drawing Figures

U.S. Patent  May 24, 1977  4,025,250
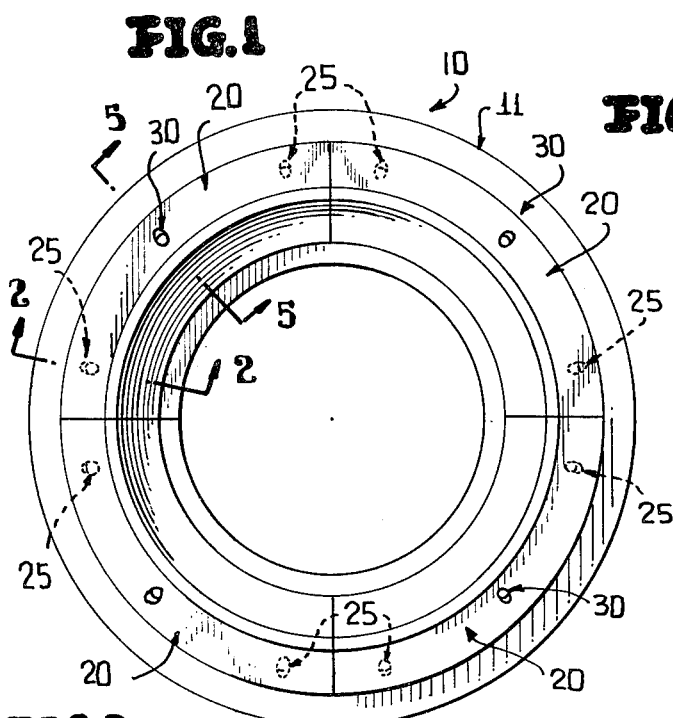
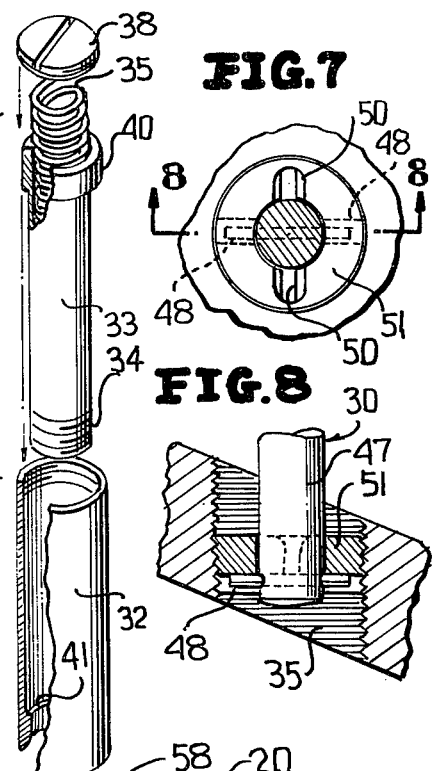
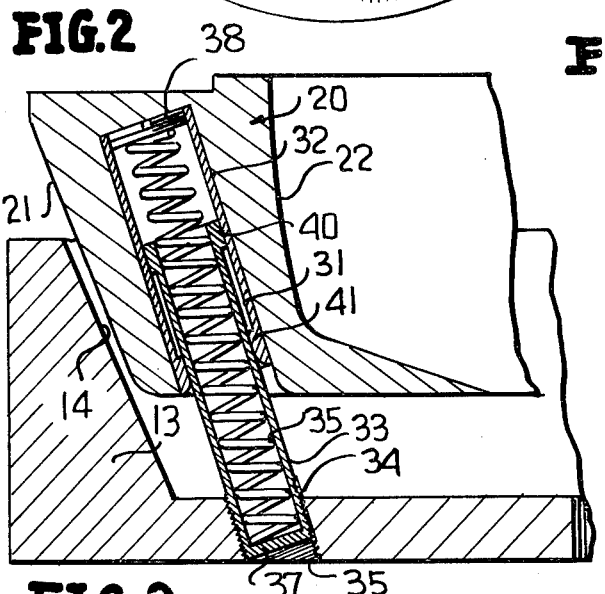
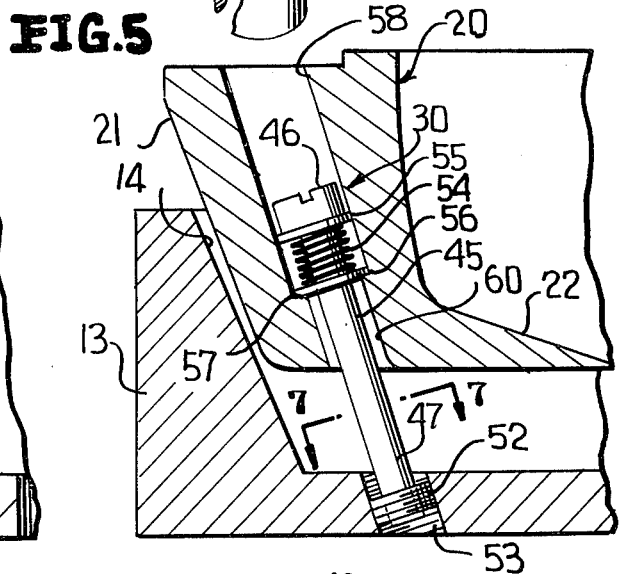
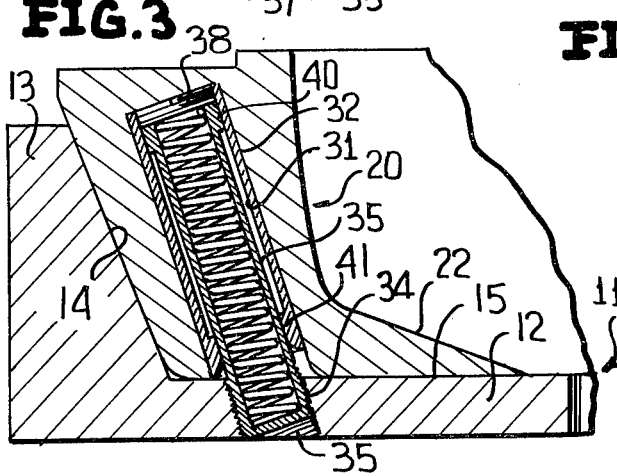
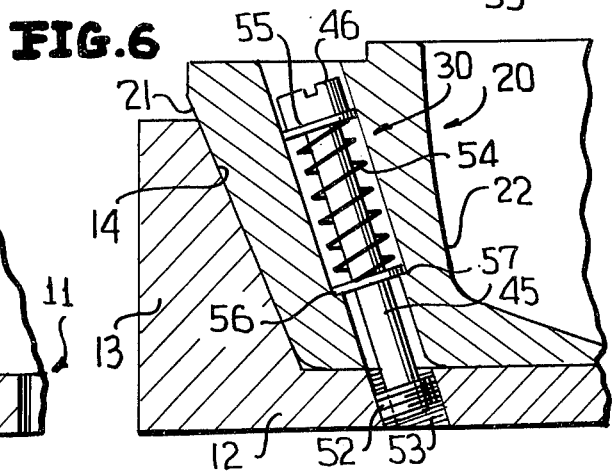

SEGMENTED MATRIX WITH GUIDE MEANS AND RETAINING PINS

The present invention is directed to a novel retreading mold in which a plurality of matrix segments are moved relative to a base much in the manner disclosed in applicant's U.S. Pat. No. 3,778,203 issued Dec. 11, 1973, and entitled MATRIX ASSEMBLY WITH SEGMENTED MATRICES.

The latter patent discloses a plurality of matrix segments which are moved relative to a base portion and are biased away therefrom by spring-biased guide means. A difficulty with the latter-identified disclosure is the inability to obtain desired versatility in regard to changeovers for different size tires. For example, the matrix segments define a retread cavity which can be utilized for retreading a particular size tire. If, however, a different size tire is desired to be retreaded, then it is generally required to virtually substitute an entire new system for biasing purposes and applicant's knowledge plus the prior art indicate that such transformation of one particular mold for another requires a substantial amount of down time for reconversion purposes. Thus the primary object of this invention is to assure that irrespective of the particular size tire to be recapped, the transformation time for any particular size tire is virtually minimized to an optimum.

The primary object of this invention is achieved by virtue of the fact that both the means for expanding or urging the matrix segments away from the base are carried by the base as are guide and retaining pins, likewise carried by the base. The later are also coupled by a quick-coupling and uncoupling means to the base so that other matrix segments can be substituted for former matrix segments in a rapid manner.

The basic object of this invention is to provide a novel retread mold in which the matrix segments can be readily removed and resubstituted one for another depending upon tire size while still maintaining the exact alignment necessary for retreading purposes. The latter object is achieved by utilizing guide means for permitting accurate guiding motion between matrix segments and a base while at the same time providing quick-disconnect and connect pins for disassembly and reassembly of particular matrix segments relative to a mold or platen.

The foregoing object is achieved by the provision of guide means in the form of a spring which biases the matrix segments and base relative to each other with the spring or springs being encapsulated by a pair of relatively telescopically united sleeves which are captively united to the base to permit the matrix sections to be removed therefrom and another matrix segment applied thereto without any change in the construction of the components. Retaining pins simply assure that the matrix segment cannot be totally disunited from the base unless the pins are removed by virtue of a quick-uncoupling arrangement.

With the above and other objects in view that will hereinafter appear, the nature of the invention will be more clearly understood by reference to the following detailed description, the appended claims and the several views illustrated in the accompanying drawings.

IN THE DRAWINGS

FIG. 1 is a top point of view of a novel mold assembly constructed in accordance with this invention, and illustrates a plurality of matrix sections which define an annular chamber and which are united to a base by retaining pins though being urged to an open position by spring-biased guide means.

FIG. 2 is a fragmentary enlarged cross sectional view taken generally along line 2—2 of FIG. 1, and illustrates one of the plurality of spring-biasing means for urging the matrix segments away from the base.

FIG. 3 is a view identical to that of FIG. 2, but illustrates one of the matrix segments in its retreading position fully retracted within its base.

FIG. 4 is a fragmentary exploded perspective view of the guide means of FIGS. 2 and 3, and illustrates the manner in which a spring is housed within a pair of tubular sleeves closed by a threaded cap.

FIG. 5 is a fragmentary enlarged sectional view taken generally along line 5—5 and illustrates pin means for preventing the matrix sections from being removed from the base under the influence of the guide means of FIGS. 2 and 3.

FIG. 6 is a fragmentary sectional view similar to FIG. 5, and illustrates the closed or compressed position in which the matrix segments are received totally within the base.

FIG. 7 is a cross sectional view taken generally along line 7—7 of FIG. 5, and illustrates the manner in which a pin for retaining the matrix segments is united to the base by a keyhole connection.

FIG. 8 is a fragmentary sectional view taken generally along line 8—8 of FIG. 7, and more clearly illustrates the details of the keyhole connection.

A novel mold assembly constructed in accordance with this invention is shown and designated by the reference numeral 10 and includes an annular or circular base 11 provided with a bottom wall 12 and a peripheral wall 13. The peripheral wall 13 includes an inner peripheral frusto-conical surface 14 which merges with a bottom surface 15. Seated within the base 11 is a plurality of matrices, four in number as viewed in FIG. 1, and each being generally designated by the reference numeral 20.

Each matrices or matrix segment includes a frusto-conical outboard peripheral surface 21 which corresponds to the configuration of the surface 14. An inboard surface 22 is contoured to the general configuration of a tire which is to be recapped within the mold assembly 10.

The mold assembly 10 includes means for normally urging each matrix segment 20 away from the base 11 in the manner illustrated in FIG. 2. The latter-mentioned means is generally designated by the reference numeral 25, and two such means 25 are provided for each segment 20, although more or less of the latter-mentioned number may be provided. In addition, each segment 20 includes means coupled between the base 11 and the matrix 20 for precluding the matrix 20 from being totally disassembled from the base 11. The latter-mentioned means is generally designated by the reference numeral 30 (FIGS. 5 and 6). There is one such means 30 associated with each segment 20, but here again additional such means 30 might be provided for the purpose intended.

Each segment 20 includes one or more bores 31 (FIGS. 2 and 3) each receiving a sleeve 32 which in turn internally receives a telescopic sleeve 33, the latter of which has a lower threaded end portion 34 received in a threaded bore 35 of the lower wall 12 of the base 11. Spring means, generally designated by the reference numeral 35, is encapsulated between the sleeves 32, 33 and normally urges the matrix segments 20 away from the bottom wall 12 of the base 11 in the manner best illustrated in FIG. 5. Each spring 35 is held captive within the sleeves 32, 33 by a lower end wall 37 of the sleeve 35 and a threaded cap 38 threaded into an upper end portion (unnumbered) of the sleeve 32. The sleeve 33 includes a radially outwardly directed annular rib or abutment means 40 which is aligned for contact against a radially inwardly directed annular rib 41 of the sleeve 33. Thus, should the sleeve 32 move upwardly beyond the position shown in FIG. 2, the rib 40 will contact the rib 41 and disassembly of the sleeves 32, 33 is precluded. It is to be particularly noted that the sleeve 33 due to its threaded connection at 34 with the threaded bore 35 creates a situation in which the matrix segments 20 can be readily removed and replaced by other matrix segments having a contour differing from that of the surface 22. The importance of this is the fact that the guide means 25 are secured and retained solely by the base portion 11 by the connection between the lower threaded end portion 34 of each sleeve 33 and the threaded bore 35 of the lower wall 12 of the base 11.

Each of the matrix segments 20 would normally be free to be removed from the base 11 by an upward motion, as viewed in FIGS. 2 and 3. However, each matrix section 20 must be retained within the base 11 since an identical mold assembly is reciprocated thereatop such that the matrix segments 20 thereof are moved to the closed position shown in FIGS. 1 and 3. Thus, in order that the matrix segments 20 are not overly projected from the interior of the base 11 the means 30 are provided to preclude disassembly of the segments 20 and the base 11. Each of the means 30 includes a threaded pin 45 having a head 46 (FIG. 5) and an end portion 47 carrying a pin or key 48 which can pass through a slot 50 of a retainer 51 which includes threads 52 threaded into a threaded bore 53 of the bottom wall 12 of each mold 11. A spring 54 is sandwiched between a pair of washers 55, 56 between the head 46 of the pin 45 and an abutment shoulder 57 of a bore 58 formed in each segment 20 which is counter-bored at 60. Thus the pin 45 can be rotated 90° to uncouple the same from the retainer 52 by the passage of the pin 48 through the slot 50. By removing each pin 30 any particular segment 20 can be readily removed from the base 11 and another segment repositioned therein which would vary in configuration relative to the surface 22. Thus the same base 11 can be utilized for recapping various diameter tires by simply removing the segments 20 and replacing the same by other segments having a different internal diameter relative to the surface 22. It is important to note that the segments may be identical for any tire other than the interior shape or dimension of the surface 22 whereas the bores 31 would be identically positioned to accept any particular matrix segment. Thus, any particular matrix segment can simply be slipped upon the means 25 and quick-coupled to the base 11 by means of the pins 45. This provides ready interchangeability of a particular matrix or matrix segments depending upon the particular tire to be retreaded.

While preferred forms and arrangement of parts have been shown in illustrating the invention, it is to be clearly understood that various changes in details and arrangement of parts may be made without departing from the scope and spirit of this disclosure.

I claim:

1. A mold assembly comprising a base, a matrix movable relative to said base, means carried by said base for normally urging said matrix away from said base, means between said base and matrix for guiding relative movement therebetween, means coupled between said base and matrix for maintaining the latter in assembled relationship in opposition to motion between said base and matrix created by said urging means urging said matrix away from said base, and means connected only to said base for retaining said urging means and guiding means upon said base upon the uncoupling of said coupling means and the disassembly of said matrix from said base.

2. The mold assembly as defined in claim 1 including means for coupling said maintaining means to said base.

3. The mold assembly as defined in claim 2 wherein said urging means includes a spring.

4. The mold assembly as defined in claim 2 wherein said maintaining means includes a pin coupled to said base, said pin being in sliding relationship to said matrix, and abutment means between said pin and matrix for precluding separation between said base and matrix by relative motion therebetween created by said urging means.

5. The mold assembly as defined in claim 2 wherein said urging means includes a spring, said guiding means are a pair of relatively telescopically movable sleeves encapsulating said spring, and means for preventing disassembly of said sleeves by relative telescopic movement in one direction.

6. The mold assembly as defined in claim 2 wherein said urging means includes a spring, said guiding means are a pair of relatively telescopically movable sleeves encapsulating said spring, and said retaining means includes means connecting one of said sleeves to said base.

7. The mold assembly as defined in claim 1 including means for quick-coupling and quick-uncoupling said maintaining means to said base.

8. The mold assembly as defined in claim 1 wherein said urging means includes a spring.

9. The mold assembly as defined in claim 1 wherein said maintaining means includes a pin coupled to said base, said pin being in sliding relationship to said matrix, and abutment means between said pin and matrix for precluding separation between said base and matrix by relative motion therebetween created by said urging means.

10. The mold assembly as defined in claim 1 wherein said urging means includes a spring, said guiding means are a pair of relatively telescopically movable sleeves encapsulating said spring, and means for preventing disassembly of said sleeves by relative telescopic movement in one direction.

11. The mold assembly as defined in claim 1 wherein said urging means includes a spring, said guiding means are a pair of relatively telescopically movable sleeves encapsulating said spring, and said retaining means includes means connecting one of said sleeves to said base.

12. The mold assembly as defined in claim 1 wherein said urging means includes a spring, said guiding means are a pair of relatively telescopically movable sleeves encapsulating said spring, means for preventing disassembly of said sleeves by relative telescopic movement in one direction, and said retaining means includes means connecting one of said sleeves to said base.

13. The mold assembly as defined in claim 1 wherein said guiding means is in surrounding relationship to said urging means.

14. The mold assembly as defined in claim 1 wherein said matrix is defined by a plurality of segments which in a closed position thereof define a generally annular configuration, and said urging and maintaining means are secured only to said base.

15. The mold assembly as defined in claim 1 wherein means separate and disassociated from said retaining means releasably couple said matrix to said base.

16. The mold assembly as defined in claim 1 wherein said urging means includes a spring.

17. The mold assembly as defined in claim 1 wherein said maintaining means includes a pin coupled to said base, said pin being in sliding relationship to said matrix, and abutment means between said pin and matrix for precluding separation between said base and matrix by relative motion therebetween created by said urging means.

18. The mold assembly as defined in claim 1 wherein said urging means includes a spring, said guiding means are a pair of relatively telescopically movable sleeves encapsulating said spring, and means for preventing disassembly of said sleeves by relative telescopic movement in one direction.

19. The mold assembly as defined in claim 1 wherein said urging means includes a spring, said guiding means are a pair of relatively telescopically movable sleeves encapsulating said spring and said retaining means includes means connecting one of said sleeves to said base.

20. A mold assembly comprising a base, a plurality of matrix segments movable relative to said base, said matrix segments in a closed position thereof defining a generally annular configuration, means coupled only to said base for normally urging said matrix segments away from said base, means between said base and matrix segments for guiding relative movement therebetween, means coupled only to said base for maintaining the matrix segments and base in assembled relationship in opposition to motion between said base and matrix segments created by said urging means, said maintaining means includes a plurality of pins coupled to said base, at least one pin being in sliding relationship to each matrix segment, abutment means between each pin and its associated matrix segment for precluding separation between said base and each matrix segment by relative motion therebetween created by said urging means, said urging means includes a plurality of springs, said guiding means are a pair of relatively telescopically movable sleeves encapsulating each spring, at least one of said urging means being associated with each matrix segment, means for preventing disassembly of said sleeves by relative telescopic movement in one direction, and means connected only to said base for retaining said springs and sleeves upon said base upon the uncoupling of said pins and the disassembly of said matrix segments from said base.

21. The mold assembly as defined in claim 20 including means for quick-coupling and quick-uncoupling each pin to said base.

22. The mold assembly as defined in claim 21 wherein said last-mentioned means is a key and keyhole connection between each pin and said base.

* * * * *